(12) United States Patent
Hoopes et al.

(10) Patent No.: US 11,734,441 B2
(45) Date of Patent: Aug. 22, 2023

(54) SYSTEMS AND METHODS FOR TRACING DATA ACROSS FILE-RELATED OPERATIONS

(71) Applicant: Digital Guardian LLC, Waltham, MA (US)

(72) Inventors: Jaimen Dee Hoopes, Lehi, UT (US); Christian J Weibell, Lindon, UT (US)

(73) Assignee: DIGITAL GUARDIAN LLC, Waltham, MA (US)

( * ) Notice: Subject to any disclaimer, the term of this patent is extended or adjusted under 35 U.S.C. 154(b) by 199 days.

(21) Appl. No.: 16/731,726

(22) Filed: Dec. 31, 2019

(65) Prior Publication Data
US 2021/0200888 A1  Jul. 1, 2021

(51) Int. Cl.
| | |
|---|---|
| *G06F 21/62* | (2013.01) |
| *G06F 16/16* | (2019.01) |
| *G06F 16/17* | (2019.01) |
| *G06T 11/20* | (2006.01) |
| *G06F 3/01* | (2006.01) |
| *H04L 9/40* | (2022.01) |
| *H04L 67/01* | (2022.01) |

(52) U.S. Cl.
CPC ........ *G06F 21/6218* (2013.01); *G06F 16/168* (2019.01); *G06F 16/1734* (2019.01); *G06T 11/206* (2013.01); *G06F 21/6245* (2013.01); *G06T 2200/24* (2013.01); *H04L 63/1433* (2013.01); *H04L 67/01* (2022.05)

(58) Field of Classification Search
CPC .................................................... G06F 3/0482
See application file for complete search history.

(56) References Cited

U.S. PATENT DOCUMENTS

| | | | | |
|---|---|---|---|---|
| 6,493,868 | B1 * | 12/2002 | DaSilva | H04L 1/20 345/1.3 |
| 7,197,638 | B1 * | 3/2007 | Grawrock | G06F 21/6218 726/30 |
| 8,484,578 | B2 * | 7/2013 | Gordner | G06F 3/0482 715/705 |
| 8,621,287 | B1 * | 12/2013 | Ethington | G06F 11/327 714/48 |
| 9,418,356 | B2 * | 8/2016 | Crevier | H04L 61/4555 |
| 9,715,534 | B2 * | 7/2017 | Beausoleil | G06F 40/186 |
| 10,007,405 | B2 * | 6/2018 | D'Amore | G06F 3/0484 |
| 10,394,691 | B1 * | 8/2019 | Cole | G06F 11/079 |
| 2003/0088854 | A1 * | 5/2003 | Wygodny | G06F 11/3636 714/E11.212 |
| 2007/0156670 | A1 * | 7/2007 | Lim | H04L 63/205 |
| 2008/0091656 | A1 * | 4/2008 | Charnock | G06F 16/358 707/E17.093 |

(Continued)

*Primary Examiner* — Nicholas Augustine
(74) *Attorney, Agent, or Firm* — Fredrikson & Byron, P.A.

(57) ABSTRACT

Provided herein are systems and methods of tracing data. A tracing engine may receive, via the user interface, a selection of a target file or an event involving the target file. The tracing engine may generate, responsive to receiving the selection, a trace of first data in the target file to a plurality of file instances in a network each having at least one version of the first data. Each of the plurality of file instances may be related to at least the target file or another of the plurality of file instances via at least one file operation or data operation. The tracing engine may render, via a user interface, the generated trace.

20 Claims, 13 Drawing Sheets

(56) References Cited

U.S. PATENT DOCUMENTS

| | | | |
|---|---|---|---|
| 2010/0228750 A1* | 9/2010 | Solin | G06F 16/1734 |
| | | | 707/755 |
| 2013/0019028 A1* | 1/2013 | Myers | G06F 40/197 |
| | | | 709/246 |
| 2014/0068550 A1* | 3/2014 | Simitsis | G06F 9/5038 |
| | | | 717/105 |
| 2015/0309915 A1* | 10/2015 | Ajith Kumar | G06F 11/3612 |
| | | | 717/128 |
| 2015/0310188 A1* | 10/2015 | Ford | H04L 63/0428 |
| | | | 726/28 |
| 2016/0196198 A1* | 7/2016 | Ajith Kumar | G06F 11/3476 |
| | | | 714/45 |
| 2017/0063897 A1* | 3/2017 | Muddu | H04L 41/0893 |
| 2017/0270022 A1* | 9/2017 | Moresmau | G06F 11/302 |
| 2018/0023959 A1* | 1/2018 | Ivanov | G06F 16/284 |
| | | | 701/469 |
| 2018/0089561 A1* | 3/2018 | Oliner | G06F 16/26 |
| 2019/0207969 A1* | 7/2019 | Brown | G06F 21/552 |
| 2019/0294720 A1* | 9/2019 | Beringer | G06F 16/26 |
| 2019/0303349 A1* | 10/2019 | Burshteyn | H04L 9/0891 |
| 2020/0104518 A1* | 4/2020 | Parker | G06F 21/6209 |
| 2020/0326823 A1* | 10/2020 | Duffield | G06F 3/0484 |
| 2020/0335064 A1* | 10/2020 | Greco | G06F 16/9577 |
| 2020/0389313 A1* | 12/2020 | Singh | H04L 9/3239 |

* cited by examiner

SYSTEMS AND METHODS FOR TRACING DATA ACROSS FILE-RELATED OPERATIONS

TECHNICAL FIELD

The present application relates generally to systems and methods for monitoring operations, including but not limited to systems and methods for tracing data across file-related operations.

BACKGROUND

Data may be maintained in a networked environment. Upon a command, an action may be performed on the data. Certain commands and actions on the data may be permitted, while other commands or actions on the data may be not allowed.

SUMMARY

Described herein are systems and methods of tracing data across file-related operations. In a networked environment, data in the form of one or more files may be stored and maintained on one of the nodes of the network, such as a server, a client device, or a data storage. Various operations may be performed on the data and/or the file(s) having or constituting the data. The operations (e.g., file-related operations or data/content-related operations, hereafter sometimes generally referred to as file-related operations) may include, for example, copying, downloading, uploading, transferring, reading, renaming, writing, printing, and emailing, among others. Some of these operations may result in the creation of multiple instances of the same data or files in one or more locations in the network environment (e.g., via uploading, copying, emailing, or transferring). Other operations may yield modifications to the data content within the file (e.g., via reading and writing). Still, other operations may result in the replication of the data in an off-network medium (e.g., via printing or downloading onto a removable disk).

A diagnostic or monitoring tool or system (hereafter sometimes referred as a diagnostic tool) executing on a computing device may be used to keep track and/or log various operations occurring throughout the networked environment, including the operations affecting the data maintained in one or more of the network nodes. Upon request, the diagnostic tool may display the log of the multitude of operations detected throughout the network environment, for instance, in a delimited or list format. Based on the log, an administrator of the network may pinpoint potentially vulnerable points in the network and take precautionary measures to safeguard sensitive data from such points. While the log may allow access to the recorded operations occurring throughout the network, the raw data in the delimited or list format may not be easily or readily consumed and analyzed by the administrator operating the diagnostic tool. As such, the log may be of limited utility, and may result in a myriad of weak points in the network going unnoticed or being overlooked.

To increase the utility of such a diagnostic tool, a tracing engine may generate and provide a workspace to present a graphical and interactive visualization of a movement, access, replication, modification, egress, or deletion of data across file-related operations. In providing the workspace, the tracing engine may identify an initial context related to a file in the network and/or associated with an event of interest. From the initial context, the tracing engine may gather, trace and/or aggregate more information on the file and pieces of data contained in the file at any point in the history of the file or the history of any file from which the file (e.g., file being inspected) is derived. In aggregating, the tracing engine may identify multiple instances, copies and/or versions of the same file using a file name, a location, and/or other metadata and heuristics regarding the file. For example, the tracing engine may identify two separate file copy events as associated with the same file when the file is renamed or moved after the first copy event. Conversely, the tracing engine may determine or distinguish file instances with similar (but different) metadata as distinct or unrelated files. For example, the tracing engine may identify two separate file copy events occurring but both associated with a file named "data.doc" in "/mycomputer/somefolder/" as not related to the same file. The file copy events may occur at different times on a file named "data.doc" that was copied and then deleted, followed up by a download or creation of another file with the exact same name. In this example, the tracing engine may determine that the two copy events are related to two different files with the same name in the same location, due to the sequence of operations in time.

Based on the information gathered on the file from the aggregation, the tracing engine may generate a data trace graph for presentation or visualization in the workspace. The data trace graph may include a multi-dimensional timeline or trace of events on the file, with both branching (e.g., file copy, upload, and send as attachment) and merging (e.g., copy and paste into a file) operations, among others. Within the timeline or trace, the data trace graph may include nodes representing a file and related instances of the file throughout the network environment. The data trace graph may also have multiple inbound and outbound connections among the nodes of the graph. Each node or connection may also be adorned with or represented by an icon providing related information, such as indication of classified data, pattern match count, alarms, alerts, and file type, among others. With respect to the data trace graph, the workspace may include another number of features to modify visualization of the files and/or related events to the files. For example, the workspace may include or support scroll, zoom, pan, highlight, a hover over, and selection on a particular node of the data trace graph. Upon interaction with one of the nodes or connection, the workspace may include additional information on the related file instance or event. In addition, the workspace may include a pivot function on the data trace graph that allows for a user to pull additional information on a particular context related to the file from a pivot source to a destination. For example, the workspace may include: a pivot from an alarm summary on a selected event with a file, a pivot into a new instance on a selected file that is the source of a copy and paste operation, or a pivot on a user associated with a file copy operation in the data trace graph.

By aggregating the information on a file and operations on the file, and presenting the results in this manner, the tracing engine may allow the user of the diagnostic tool to more readily access information on the file and various events in relation to the file. For example, using the data trace graph presented via the workspace, the user of the diagnostic tool may inspect and examine various events on the file in the form of a multi-dimensional timeline graph. In addition, the pivot feature of the workspace may permit the user to examine events of potential interest on the file. The workspace may allow the user to more readily identify or pinpoint potentially vulnerable points in the network environment and take precautionary countermeasures to protect classified or sensitive data contained in the files. With the vulnerable points identified and precautionary measures taken using the data trace graph and the pivot function of the work space, the overall security of the network environment may be enhanced.

At least one aspect is directed to a system for tracing data. The system may include a user interface. The system may include a tracing engine executable on at least one processor. The tracing engine may receive, via the user interface, a selection of a target file or an event involving the target file. The tracing engine may generate, responsive to receiving the selection, a trace of first data in the target file to a plurality of file instances in a network each having at least one version of the first data. Each of the plurality of file instances may be related to at least the target file or another of the plurality of file instances via at least one file operation or data operation. The tracing engine may render, via the user interface, the generated trace.

In some embodiments, the at least one file operation or data operation may include at least one of: a file open, file write, file move, file copy, network upload, file rename, file content edit, file permission update, copy and paste, email, copy to storage, or print operation. In some embodiments, the trace may include a backward trace of the first data to a source of the first data in the network. In some embodiments, the trace may include a forward trace of the first data to at least one destination file instance. In some embodiments, the first data may include classified or sensitive data.

In some embodiments, the tracing engine may provide, for two adjacent file instances of the plurality of file instances along a portion of the trace, a corresponding file operation or data operation relating the two adjacent file instances. In some embodiments, the tracing engine may render the generated trace by displaying a graph of the generated trace.

In some embodiments, the tracing engine may render a first portion of the trace linking two adjacent file instances of the plurality of file instances, by a directional arrow corresponding to a type of file operation or data operation relating the two adjacent file instances. In some embodiments, the generated trace may represent a timeline of events corresponding to the at least one file operation or data operation. In some embodiments, the tracing engine may generate statistics of types of file operations or data operations associated with the generated trace.

At least one aspect is directed to a method of tracing data. A tracing engine may receive, via a user interface, a selection of a target file or an event involving the target file. The tracing engine may generate, responsive to receiving the selection, a trace of first data in the target file to a plurality of file instances in a network each having at least one version of the first data. Each of the plurality of file instances may be related to at least the target file or another of the plurality of file instances via at least one file operation or data operation. The tracing engine may render, in the user interface, the generated trace.

In some embodiments, the at least one file operation or data operation may include at least one of: a file open, file write, file move, file copy, network upload, file rename, file content edit, file permission update, copy and paste, email, copy to storage, or print operation. In some embodiments, the trace may include a backward trace of the first data to a source of the first data in the network. In some embodiments, the trace may include a forward trace of the first data to at least one destination file instance. In some embodiments, the first data may include classified or sensitive data.

In some embodiments, the tracing engine may provide, for two adjacent file instances of the plurality of file instances along a portion of the trace, a corresponding file operation or data operation relating the two adjacent file instances. In some embodiments, the tracing engine may render the generated trace, by displaying a graph of the generated trace.

In some embodiments, the tracing engine may render a first portion of the trace linking two adjacent file instances of the plurality of file instances, by a directional arrow corresponding to a type of file operation or data operation relating the two adjacent file instances. In some embodiments, the generated trace may represent a timeline of events corresponding to the at least one file operation or data operation. In some embodiments, the tracing engine may generate statistics of types of file operations or data operations associated with the generated trace.

At least one aspect is directed to a non-transitory computer readable medium storing program instructions. The program instruction may cause one or more processors to receive, via a user interface, a selection of a target file or an event involving the target file. The program instruction may cause the one or more processors to generate, responsive to receiving the selection, a trace of first data in the target file to a plurality of file instances in a network each having at least one version of the first data. Each of the plurality of file instances may be related to at least the target file or another of the plurality of file instances via at least one file operation or data operation. The program instruction may cause the one or more processors to render, via the user interface, the generated trace.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

It should be understood that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The features and advantages of the concepts disclosed herein will become more apparent from the detailed description set forth below when taken in conjunction with the drawings.

DETAILED DESCRIPTION

Following below are more detailed descriptions of various concepts related to, and embodiments of, inventive systems and methods for tracing data across file-related operations. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Section A describes a network environment and computing environment which may be useful for practicing various computing related embodiments described herein.

Section B describes systems and methods for tracing data across file-related operations.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

A. Computing and Network Environment

Prior to discussing specific embodiments of the present solution, it may be helpful to describe aspects of the operating environment as well as associated system components (e.g., hardware elements) in connection with the methods and systems described herein.

Figure 1A:
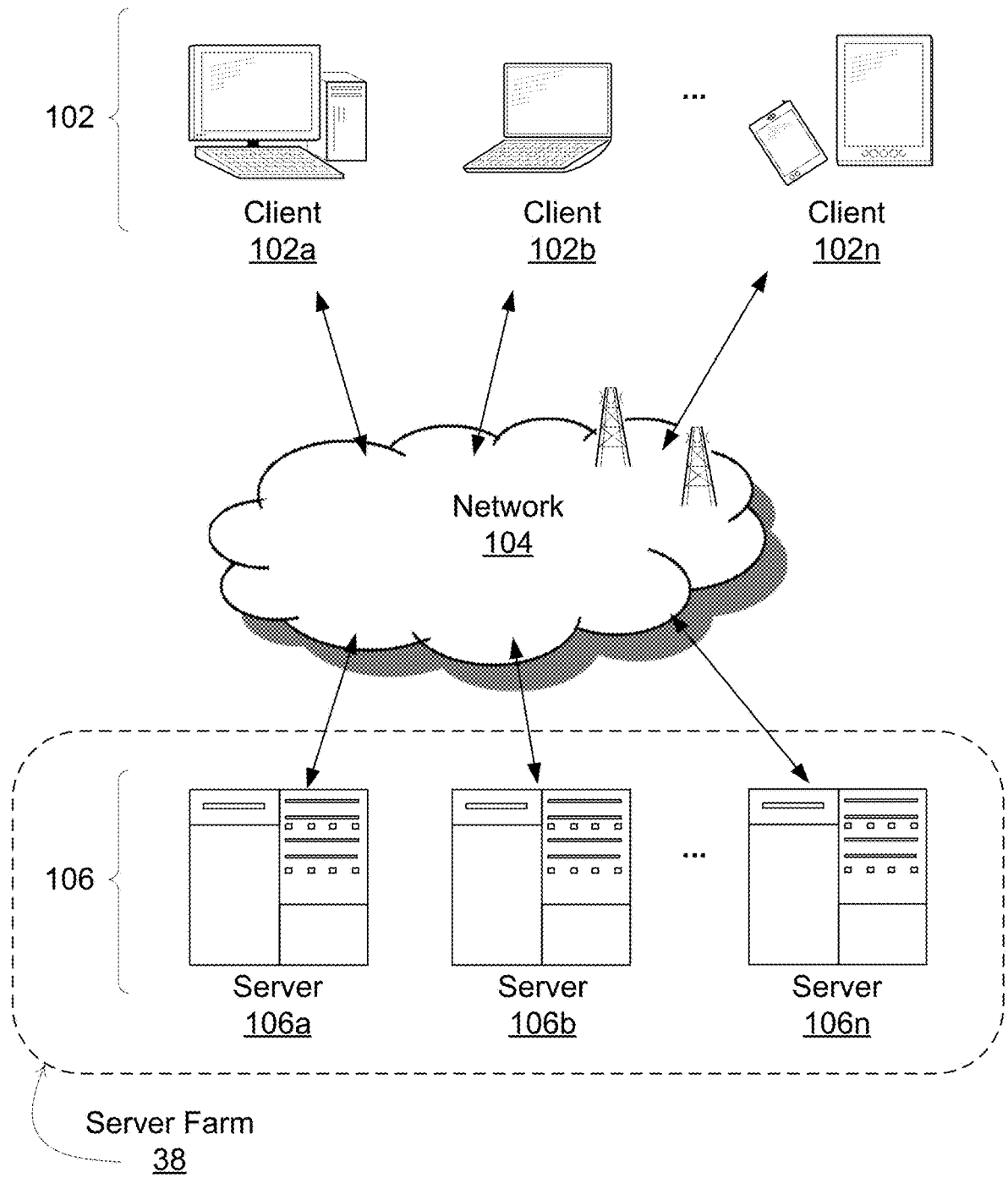
FIG. 1A is a block diagram depicting an embodiment of a network environment comprising client devices in communication with server devices.

Referring to FIG. 1A, an embodiment of a network environment is depicted. In brief overview, the illustrated exploring network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106. The clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, NFC, RFID Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network, which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualized physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes may be in the path between any two communicating servers.

Figure 1B:
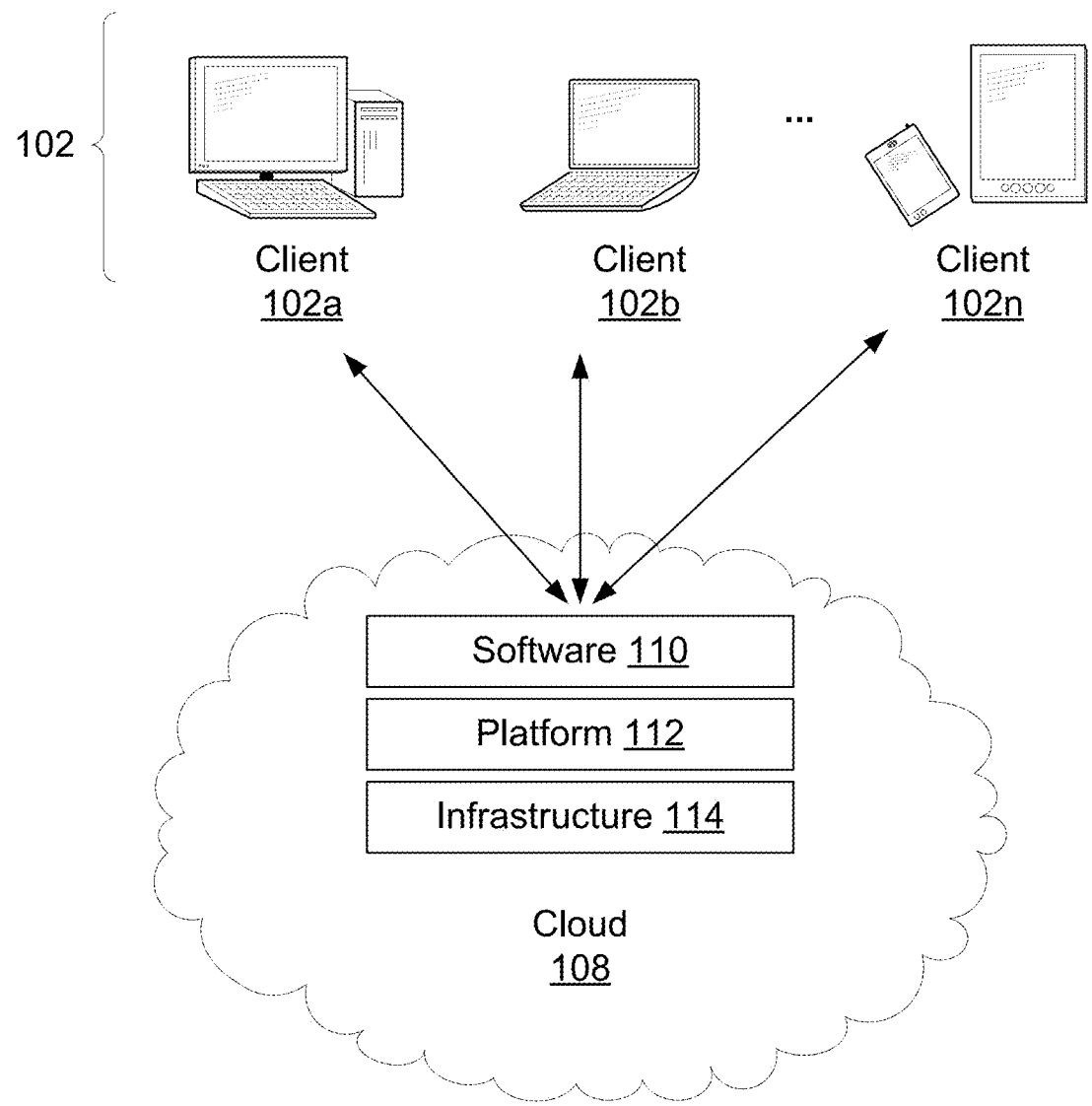
FIG. 1B is a block diagram depicting a cloud computing environment comprising client devices in communication with a cloud service provider.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
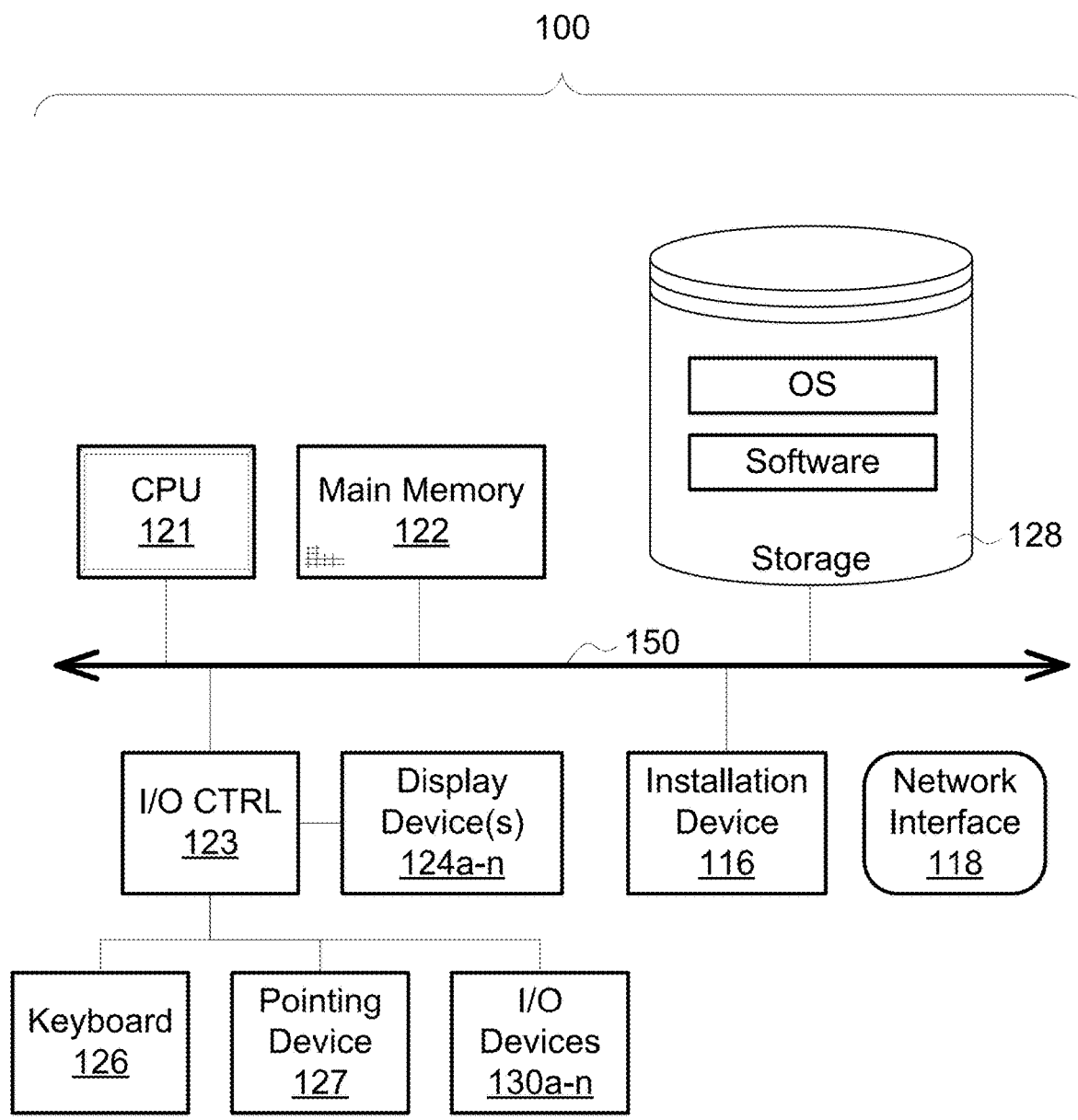
FIGS. 1C and 1D are block diagrams depicting embodiments of computing devices useful in connection with the methods and systems described herein.
Figure 1D:
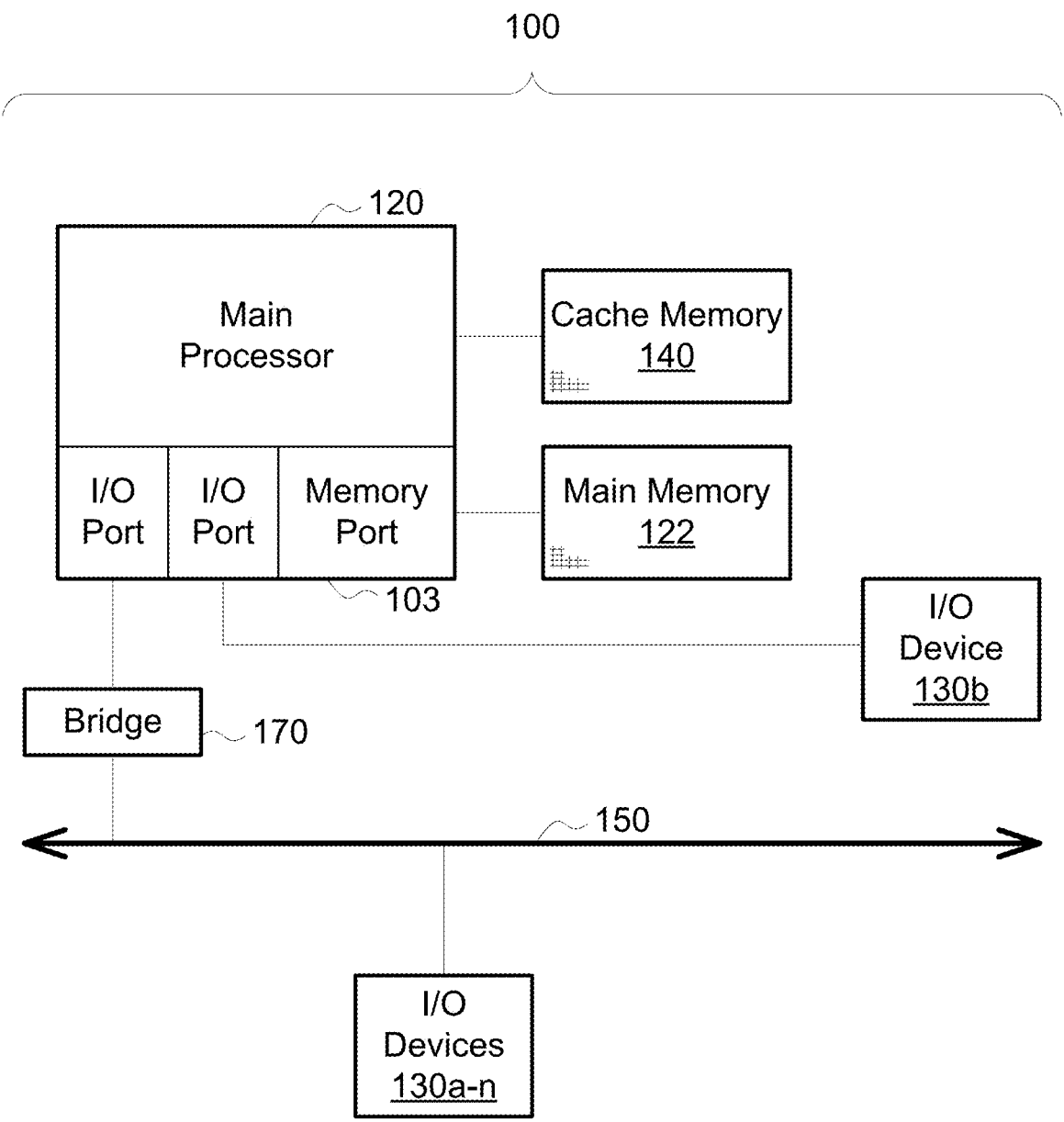

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, and/or software 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call. In some embodiments, the communication device 102 is a wearable mobile computing device including but not limited to Google Glass and Samsung Gear.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Tracing Data Across File-Related Operations

Figure 2:
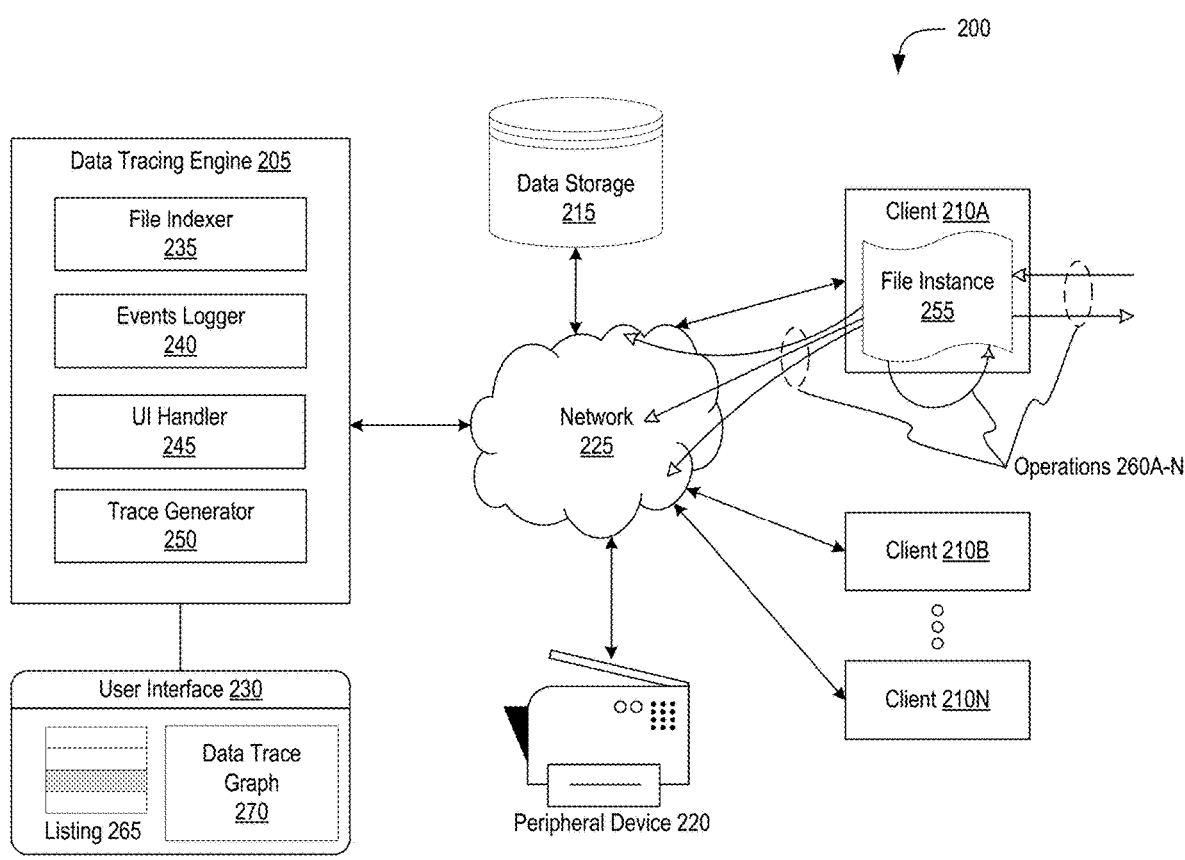
FIG. 2 is a block diagram depicting an example embodiment of a system for tracing or investigating data across file-related operations.

Referring now to FIG. 2, depicted is a block diagram of an embodiment of an environment or a system 200 for tracing data across file-related operations. In overview, the system 200 may include at least one data tracing engine 205, one or more clients 210A-N (generally referred herein as clients 210), at least one data storage 215, at least one peripheral device 220, and at least one network 225. The data tracing engine 205 may handle, provide, update and/or drive at least one user interface 230. The data tracing engine 205 may include at least one file indexer 235, at least one events logger 240, at least one user interface (UI) handler 245, and at least one trace generator 250, among others. The network 225 may communicatively couple the data tracing engine 205, the one or more clients 210, the data storage 215, the peripheral device 220, and/or the user interface 230 with one another.

Each of the above-mentioned elements or entities (e.g., the data tracing engine 205 and its components, the clients 210, the data storage 215, the peripheral device 220, and the network 225) is implemented in hardware, or a combination of hardware and software, in one or more embodiments. For instance, each of these elements or entities could include any application, program, library, script, task, service, process or any type and form of executable instructions executing on hardware of the system, in one or more embodiments. The hardware includes circuitry such as one or more processors, for example, as described above in connection with FIGS. 1A-1D, in some embodiments, as detailed in section A.

In further detail, at least one of the clients 210 (e.g., the first client 210A as depicted) may store or maintain at least one file instance 255 (also generally referred herein as a file). In some embodiments, the file instance 255 may be stored or maintained on another device in the system 200, such as one of the other clients 210, the data storage 215, or another network node connected to the network 225. The file instance 255 may contain, hold, or otherwise include data (sometimes referred herein as contents). At least some of the data included in the file instance 255 may be classified or sensitive. For example, the data in the file instance 255 may include personally identifiable information (PII), such as address, account identifier, social security number, bank account number, or credit card number, among others. The file instance 255 may be of a particular file format in accordance with to which an application running on the client 210 may access the contents of the file instance 255. The file format may include, for example: a document file (e.g., .DOCX, .PDF, .XLS, .PPTX, .PS, .DVI, or .HTML), an image file (e.g., .GIF, .JPEG, or .BMP), an audio file (e.g., .WAV, .AIFF, or .MPEG), a video file (e.g., .WMV, .MPG, or .MOV), a text file (e.g., .TXT), and a database file (e.g., .MDB, .MDF, or .DB), among others. The file instance 255 may be stored on a location within the system 200 (e.g., the first client 210A as depicted). The location of the file instance 255 may be referenced in accordance with a file system of the device or a web address (e.g., a file path or a Universal Resource Locator (URL)) on the network 225. The address for the file instance 255 may include a set of alphanumeric characters, such as a combination of a device or drive, a directory, a subdirectory, and a file name, among others. The file instance 255 may also include or be associated with descriptive metadata in accordance with a file format. The metadata for the file instance 255 may include, for example: an author, author information, a version number, a data created, a date last modified, a content length, and a file size, location, classification, readable/writable/executable status, among others.

While maintained in the environment, any number of operations 260A-N (hereinafter sometimes generally referred to as operations 260) may be performed on the file instance 255 from any of the devices (e.g., one of the clients 210). The operations 260 performed on the file instance 255 may be data-related operations to access and edit the contents of the file instance 255. The data-related operations may include: a file open to access the contents of the file instance 255; a file write to modify, add, or delete the contents of the file instance 255; a file content edit to modify the data included in the file instance 255; copy and paste to cache and reproduce at least some portion of the contents in the file instance 255; and a print operation to reproduce the contents of the file instance 255 to paper via the peripheral device 220, among others. The data-related operations may result in the modification of the contents of the file instance 255.

In addition, the operations 260 performed on the file instance 255 may be file-related operations to modify the file instance 255 itself. The file-related operations may include: a file copy to cache or replicate the file instance 255; a file rename to change the name of the file instance 255; a file move to relocate or transfer the file instance 255 from one location to another location in the system 200; a network upload to send the file instance 255 from a computing device (e.g., the first client 210A) to a network location (e.g., data storage 215); an email with the file instance 255 attached to send to a recipient; a file permission update to edit access rights (e.g., read, write, or execute) to the file instance 255; and a copy to storage to replicate the file instance 255 to another drive (e.g., a removable drive connected to the first client 210A), among others. The file-related operations may result in one or more versions of the same file instance 255 throughout the system 200 via the network 225. With data-related operations in conjunction with file-related operations for instance, the multiple file instances 255 may include same or different versions of data. For example, as a result of a file copy, two instances of the same file instance 255 may be created. Subsequently, one of the file instances 255 may undergo a file-content edit operation to modify the contents of the file instance 255, yielding a different version of data from the other file instances 255.

The file indexer 235 executing on the data tracing engine 205 may retrieve, receive, or identify each file instance 255 in the system 200. In some embodiments, the file indexer 235 may receive or identify the file instance 255 to be inspected by the data tracing engine 205 via the user interface 230. The user interface 230 presented by the data tracing engine 205 (e.g., via a display) may include a listing 265 from which to select one or more file instances 255 for inspection by the data tracing engine 205. The listing 265 may include at least one user interface element (e.g., a radio button, a checkbox, or an icon) representing a corresponding file instance 255. The user interface element may include the filename and/or location of the corresponding file instance 255. The user interface handler 245 may monitor for interactions with any of the user interface elements of the listing 265 on the user interface 230. Upon detecting an interaction with the user interface element of the listing 265, the file indexer 235 may receive or identify the selected file instance 255 for inspection.

In some embodiments, the file indexer 235 may access each device (e.g., the clients 210 or the data storage 215) in the system 200 to identify the one or more file instances 255 on the device. For example, the file indexer 235 may access the file system of the first client 210A to identify the file instances 255 maintained thereon. In some embodiments, upon identification of the file instance 255 stored on the device, the file indexer 235 may populate, insert, or otherwise include the file instance 255 for display on the listing 265 of the user interface 230 (e.g., by adding a corresponding user interface element). In some embodiments, the file indexer 235 may receive a list of file instances 255 to be inspected by the data tracing engine 205 via the network 225. For example, a user of the first client 210A may send the list including the file instance 255 stored on the first client 210A to the file indexer 235.

With the identification, the file indexer 235 may identify various characteristics, attributes, or other information of the file instance 255. In some embodiments, the file indexer 235 may access the data within the file instance 255 to identify which portions of data are classified or sensitive. In some embodiments, the file indexer 235 may use a natural language processing algorithm (e.g., named-entity recognition or information extraction) or a template to identify which portions in the content of the file instance 255 are classified or sensitive. The file indexer 235 may also identify or determine a count of occurrences (sometimes referred herein as classified matches) of classified or sensitive data within the contents of the file instance 255. In some embodiments, the file indexer 235 may identify the file format of the file instance 255. In some embodiments, based on the file format, the file indexer 235 may determine a file type of the file instance 255, such as a document file, an image file, an audio file, a video file, a text file, and a database file, among others. In some embodiments, the file indexer 235 may location of the file instance 255 in the form of the address referencing the location. In some embodiments, the file indexer 235 may identify the descriptive metadata associated with the file instance 255 (e.g., a time of creation and a time of most recent modification).

The events logger 240 executing on the data tracing engine 205 may identify the one or more operations 260 (sometimes referred herein as events) performed on the file instance 255. In some embodiments, the event logger 240 may identify the operations 260 performed on the file instance 255 selected via the listing 265 of the user interface 230. In addition to the file instance 255, the listing 265 may also include one or more operations 260 for inspection by the data tracing engine 205. The listing 265 may include at least one user interface element (e.g., a radio button, a checkbox, or an icon) representing a corresponding operation 260. The user interface element may include the filename and location of the corresponding file instance 255 and the operation 260 performed on the file instance 255. The user interface handler 245 may monitor for interactions with any of the user interface elements of the listing 265 on the user interface 230. Upon detecting an interaction with the user interface element of the listing 265, the file indexer 235 may receive or identify the selected operation 260 for further inspection.

The events logger 240 may identify various other characteristics, attributes, or other information of the operation 260 performed on the file instance 255. In some embodiments, the events logger 240 may access the device (e.g., the first client 210A as depicted) on which the file instance 255 is stored to monitor for operations 260. For each identified operation 260 performed on the file instance 255, the events logger 240 may identify an operation type. The operation type may include, for example, data-related operations (e.g., a file open; a file write; a file content edit; copy and paste; and a print operation) or file-related operations (e.g., a file copy; a file rename; a file move; a network upload; email; a file permission update; and a copy to storage), among others. In some embodiments, the events logger 240 may identify a timestamp indicating a date and a time at which the operation 260 was performed on the file instance 255. In some embodiments, upon identification of the operation 260, the file indexer 235 may populate, insert, or otherwise include the operation 260 for display on the listing 265 of the user interface 230 (e.g., by adding a corresponding user interface element). In some embodiments, the events logger 240 may calculate, determine, or generate statistics on types of operations performed on the file instances 255. The statistics may, for example, include: a number or frequency of types of operations detected being performed on the file instance 255, a number of different types of operations, or a time of day at which the type(s) of operations is/are performed. The statistics may be arranged by the type of operation, such as data-related operations and file-related operations, among others.

In some embodiments, the events logger 240 may identify a source of the operation 260. The source may reference which entity or location from which the operation 260 was initiated, and may include a user, an account, an application, and/or a device (e.g., the client 210), among others. In some embodiments, the events logger 240 may identify a target destination of the operation 260. The target destination may reference a location to which the operation 260 is effectuated with respect to the file instance 255. For example, the operation 260 may be a network upload of the file instance 255 from the first client 210 to the data storage 215. In this example, the events logger 240 may identify the data storage 215 as the target destination for the operation 260. In some embodiments, the events logger 240 may determine whether the operation 260 performed on the file instance 255 is permitted or restricted in accordance with a security policy. The security policy may be specified by an administrator of the device (e.g., the first client 210A), the network 225, or the system 200, and may enumerate which types of operations 260 are allowed or restricted from being performed on the file instance 255. By comparing the operation 260 to the specifications of the security policy, the events logger 240 may identify whether the operation 260 performed on the file instance 255 was permitted or restricted.

The trace generator 250 executing on the data tracing engine 205 may generate at least one data trace (also sometimes referred herein as a trace) in response to the selection of the file instance 255 or one of the operations 260 performed on the file instance 255. The data trace may associate or relate a set of instances of the same file instance 255 with one another via the operations 260 performed to one of the instances in the set. The data trace for a particular file instance 255 may represent a timeline series (or sequence or order) of events corresponding to operations 260 performed on the various instances of the same file instance 255. The data trace may be generated for a portion of data in the selected file instance 255 among the set of instances of the same file instance 255 within the system 200. The portion of data may correspond to classified or sensitive data. At least some of the file instances 255 may have a different version of the portion of data (e.g., as a result of file content edit). Each of the instances in the set of instances may be related to one another via at least one of the operations 260 (e.g., data-related or file-related operations). The generation of the data trace by the trace generator 250 may depend based on whether one of the file instances 255 was selected or one of the operations 260 performed on one file instance 255 is selected.

When the selection is one of the operations 260, the trace generator 250 may identify the file instance 255 to which the selected operation 260 is performed. When the selection is one of the file instances 255, the trace generator 250 may identify the one or more instances of the same file instance 255 throughout the system 200. The identification of the other instances may also be performed when the selection is one of the operation 260 performed on the file instance 255. In some embodiments, the trace generator 250 may identify one or more instances of file instances containing the portion of data to be inspected (e.g., corresponding to classified or sensitive data). Between a pair of identified instances, the trace generator 250 may identify one or more operations 260 associated with the file instances 255 of the pair. For example, the trace generator 250 may identify that a file copy of one file instance 255 in one location resulted in the creation of the file instance 255 in another location.

Using the various information for each identified instance the trace generator 250 may identify or determine a sequence among the file instances 255. In some embodiments, the trace generator 250 may determine the sequence for the portion of data (e.g., corresponding to sensitive or classified data) across the set of instances of the file instance 255. The sequence may enumerate a temporal order in which the respective file instance 255 (or the portion of data) was created in the system 255. The sequence may also indicate a causal or other associative relationship among the file instances 255. The sequence may have branches depending on or tracking the causal relationship between the file instances 255. In some embodiments, the trace generator 250 may determine the temporal order based on the metadata for the file instances 255 (e.g., time of creation and time of most recent modification). In some embodiments, the trace generator 250 may determine the causal relationship among the file instances 255 using the identified operation 260 between each pair of identified instances.

In some embodiments, the trace generator 250 may determine whether the initially identified file instances 255 are related to one another based on the causal relationship. At least one of the file instance 255 may have been initially identified as part of the set of instances (e.g., due to same file name). When the file instance 255 is determined as not part of the causal relationship, the trace generator 250 may identify that the file instance 255 as not related. The trace generator 250 may also remove or exclude the identified (unrelated) file instance 255 from the data trace. For example, the file instance 255 may have been initially identified as part of the set due to the same file name, but later removed or excluded upon determining that the causal relationship is not shared and thus may originate from another source. On the other hand, when the file instance 255 is determined as part of the causal relationship, the trace generator 250 may maintain the file instance 255 in the data trace.

Based on the determined sequence, the trace generator 250 may form or construct the data trace. The data trace may include or reflect the temporal order and/or causal relationship among the file instances 255 containing one or more versions of the portion of the data. The data trace may include at least one directional trace of the file instance 255 (or the portion of the data) among the set of instances for the file instance 255. The directional trace may indicate a temporal or causal association between the corresponding pair of file instances 255, and may include a forward trace or a backward trace. The forward trace may indicate that the subsequent file instance 255 is the destination or resultant file instance of the previous file instance 255. For example, the subsequent file instance 255 may have been subject to a copy and paste operation of data from another pre-existing file instance 255. Conversely, the backward trace may indicate that the previous file instance 255 is the source file instance of the subsequent file instance 255. For instance, the previous file instance 255 originally maintained on the first client 210A may have been uploaded onto the data storage 215 as the subsequent file instance 255.

With the generation, the user interface handler 245 may render, display, or otherwise present the data trace as the data trace graph 270 on the user interface 230. The data trace graph 270 may include or correspond to a graphical visualization of the data trace. The data trace graph 270 may include a graphical visualization for each file instance 255 in the set (e.g., an image or an icon of a file) and for each operation 260 relating among the file instances 255 (e.g., a directional arrow). In some embodiments, the data trace graph 270 may include one or more portions of traces. Along one of the portions, the data trace graph 270 may have graphical representations of file instances 255. Between the graphical representations of a pair of file instances 255 (e.g., adjacent to each other), the data trace graph 270 may include a graphical representation of the operation 260 relating the pair. The graphical representation of the operation 260 may be a directional arrow indicating a forward trace or a backward trace. Examples of the data trace graph 270 are detailed herein below in conjunction with FIGS. 3-8B.

Figure 3:
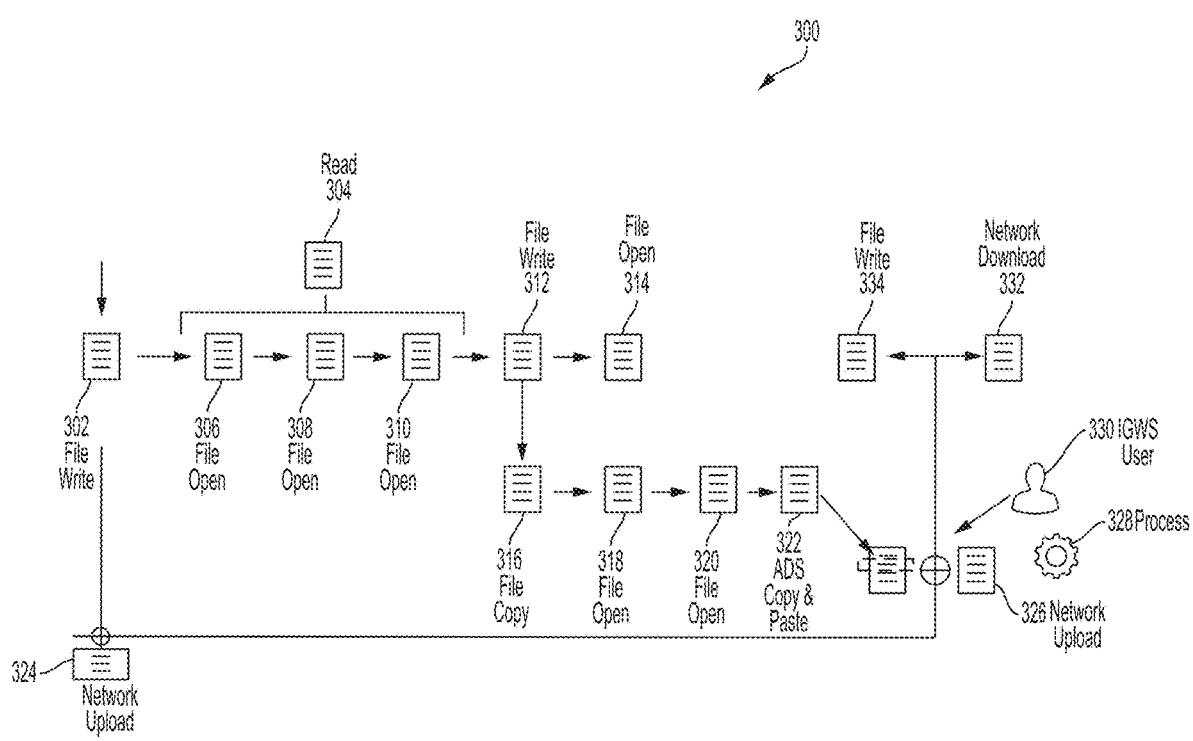
FIG. 3 is a block diagram depicting an example of a trace for a file in a computing device.

Referring now to FIG. 3, depicted is an example of a data trace graph 300 for a file instance (e.g., the file instance 255) in a computing device (e.g., the first client 210A). The data trace graph 300 may be an example of the data trace graph 270, and may have been generated by the data tracing engine 205. In one portion of the data trace graph 300, the file write icon 302 may indicate that a file instance 255 selected via the listing 265 of the user interface 230 may have been first written onto. The file read icon 304 may indicate that the file instance 255 was read, and may be associated with a series of open operations of the file instance 255 as indicated in the file open icons 306-310 rendered below the file read icon 304. The subsequent file write icon 312 may indicate that the file instance 255 was written onto.

At this juncture, the data trace graph 300 may have two branches. On one branch, the following file open icon 314 may indicate that the file instance 255 was opened. On the other branch, the file copy icon 316 may indicate that the file instance 255 was replicated. Continuing along the branch, the file open icon 318 may indicate that the copy of the file instance 255 was opened. The file open icon 320 may indicate that the file instance 255 was opened again at a later time. The clipboard copy and paste icon 322 may indicate that at least a portion of the contents in the file instance 255 was duplicated onto a clipboard and then to another file instance 255 as represented in the dotted box.

Separately, along another portion of the data trace graph 300, the network upload icon 324 may indicate that the file instance 255 was uploaded onto a location remote from the computing device (e.g., the data storage 215). This portion may be joined with the other portion of the data trace graph 300 with the network upload icon 326 indicating that the file instance 255 represented by the icon 322 was uploaded onto the remote location. In addition, the process icon 328 may indicate that identity of the application that performed the network upload operation represented by the icon 326. The user icon 330 may indicate an identity of the user that requested the network upload operation represented by the icon 326. The network download icon 332 may indicate that the file instance 255 may be downloaded onto the computing device. The file write icon 334 may indicate that the file instance 255 may be written onto via a file edit operation.

Figure 4:
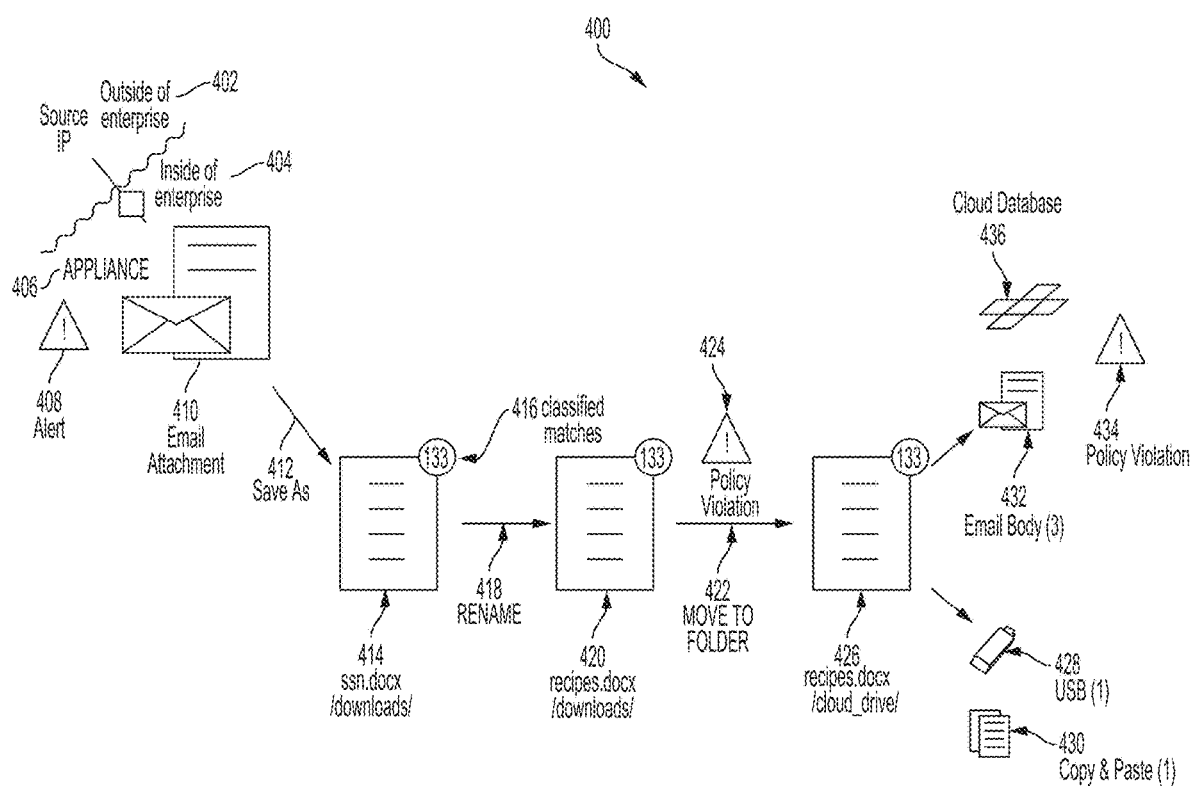
FIG. 4 is a block diagram depicting an example of a trace for a file through a networked environment.

Referring now to FIG. 4, depicted is an example of a data trace graph 400 for a file (e.g., the file instance 255) through a networked environment (e.g., the system 200). The data trace graph 400 may be an example of the data trace graph 270, and may have been generated by the data tracing engine 205. In the data trace graph 400, the text element 402 may indicate that the selected file instance 255 originates from outside an enterprise (e.g., a network of an organization or enterprise). The text element 404 may indicate that the file instance 255 is entering the enterprise, and the text element 406 may indicate that the file instance 255 is stored onto an appliance of the enterprise. The alert icon 408 may indicate that the file instance 255 may contain restricted data as defined by a security policy for the enterprise. The email attachment icon 410 may indicate that the file instance 255 is sent as an attachment to an email.

Subsequently, the "file save as" arrow 412 may indicate that the file instance 255 is saved onto a computing device (e.g., another client 210). The file icon 414 may include the filename ("ssn.docx") and path ("/downloads/") of the file instance 255 on the computing device. The indicator 416 may indicate the number of pieces of classified information within the contents of the file instance 255. The file rename arrow 418 may indicate that a file rename operation was performed on the file instance 255, and the following file icon 420 may indicate the changed filename ("recipes.docx") at the same path ("/downloads/") for the file instance 255. The file move arrow 422 may indicate that a move to folder operation was performed on the file instance 255 to change the location on the computing device. The alert icon 424 may indicate that the move to folder operation may not be permitted under the security policies.

In addition, the file icon 426 may include the filename ("ssn.docx") and the new path ("/cloud drive/") of the file instance 255 on the computing device. Here, the data trace graph 400 may branch into different branches. On one branch (e.g., depicted on bottom right), the USB icon 428 may indicate that the file instance 255 is subsequently copied onto a removable storage. The icon 430 may indicate that the operation to copy was applied on the file instance. On the other branch (e.g., depicted on top right), the email body icon 432 may indicate that the at least a portion of the contents were copied onto the body of the email via a copy and paste operation. The alert icon 434 may indicate that the operation may be in violation of the security policies. The cloud database icon 436 may indicate that the file instance 255 is stored on a cloud database.

Figure 5:
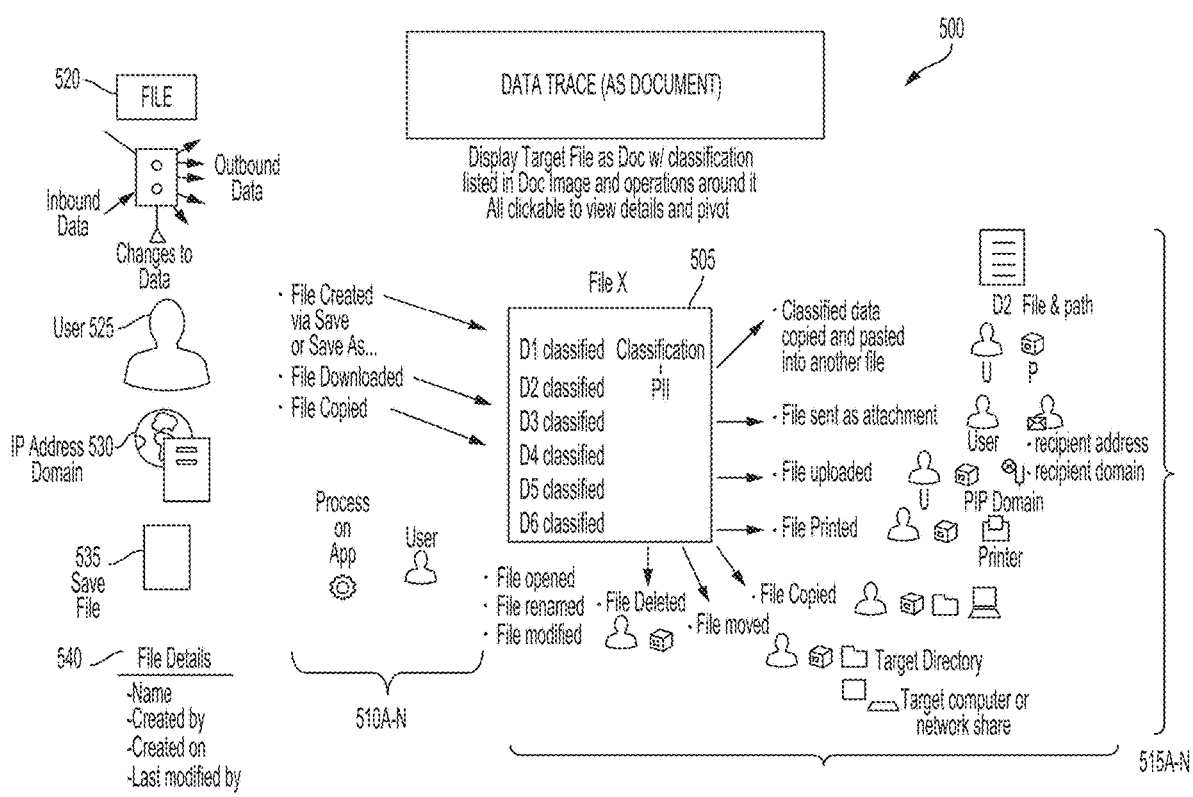
FIG. 5 is a block diagram depicting an example of a graphical user interface with icons detailing operations to a file in a data trace graph.

Referring now to FIG. 5, depicted is an example of a graphical user interface 500 with icons detailing operations (e.g., operations 260) to a single file (e.g., the file instance 255) in a data trace graph (e.g., the data trace graph 270). The graphical user interface 500 may be part of an example of the data trace graph 270, and may have been generated by the data tracing engine 205. The graphical user interface 500 may include information displayable for a single file instance 255 or one or more portions of data in the file instance 255. In the graphical user interface 500, the file icon 505 may include pieces of data that are marked as classified ("D1," "D2," . . . ). The graphical user interface 500 may include a set of icons 510A-N showing inbound operations 260 (e.g., "file created," "file downloaded," and "file copied") to the file instance 255 represented by the file icon 505, and entities (e.g., "process" and "user") that requested the performance of the operation 260. The graphical user interface 500 may include a set of icons 515A-N representing outbound operations 260 (e.g., "copy and paste," "file send," "file upload," "file print," "file copied," "file moved," file deleted," file opened," "file renamed," and "file modified") on the file instance 255, as well as entities associated with the performance of the operation 260. Various labels 520-535 may be associated with the file instance 255 and the operations 260 performed to the file instance 255 represented by the file icon 505. The file details 540 may show the descriptive metadata for the file instance 255.

Figure 6:
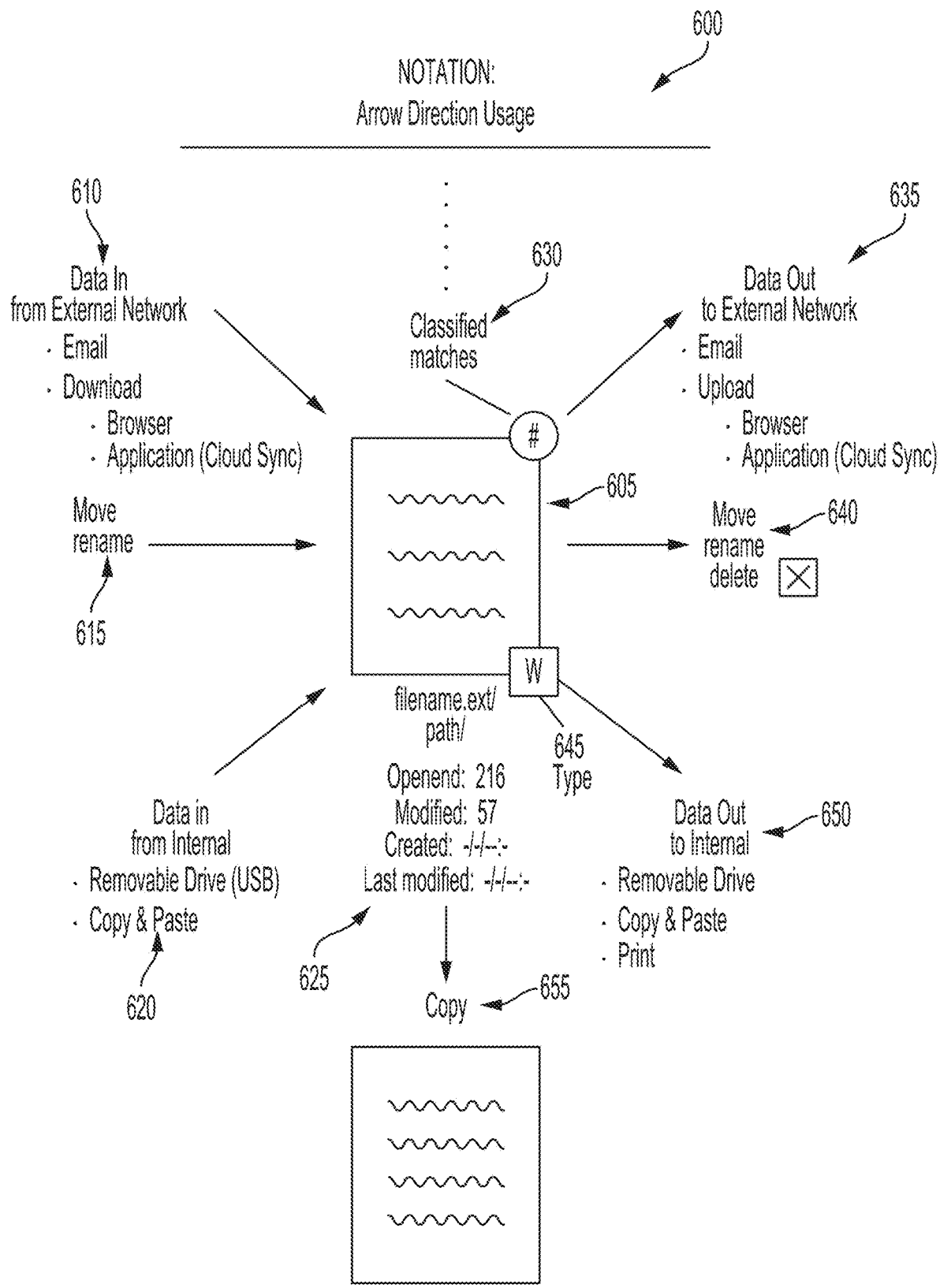
FIG. 6 is a block diagram depicting examples of directional arrows detailing different operations to a file, for use in a data trace graph.

Referring now to FIG. 6, depicted is an example set of directional arrows detailing operations (e.g., operation 260) to a file (e.g., the file instance 255) for use in a data trace graph (e.g., the data trace graph 270, displayed in a graphical user interface 600). A graphical user interface 600 may be part of an example of the data trace graph 270, and may have been generated by the data tracing engine 205. The graphical user interface 600 may indicate include one or more arrows used in indicating operations 260 performed to the file instance 255 as indicated in the file icon 605. In the graphical user interface 600, element 610 may indicate incorporating data (e.g., into the file instance 255) from an external network. Element 615 may indicate a file rename operation to the file instance 255. Element 620 may indicate incorporating data from an internal source (e.g., to the file instance 255). Element 265 may indicate descriptive metadata for the file instance 255. The indicator 630 may indicate the number of pieces of data corresponding to classified information contained in the file instance 255. Element 635 may indicate data originating from the file instance 255 sent out to an external network. Element 640 may indicate a move, rename, or a deletion operation of the file instance 255. The indicator 645 may indicate a number of types of operations performed on the file instance 255. Element 650 may indicate data moved out to an internal network location. Element 655 may indicate a copy operation performed on the file instance 255 to replicate.

Figure 7A:
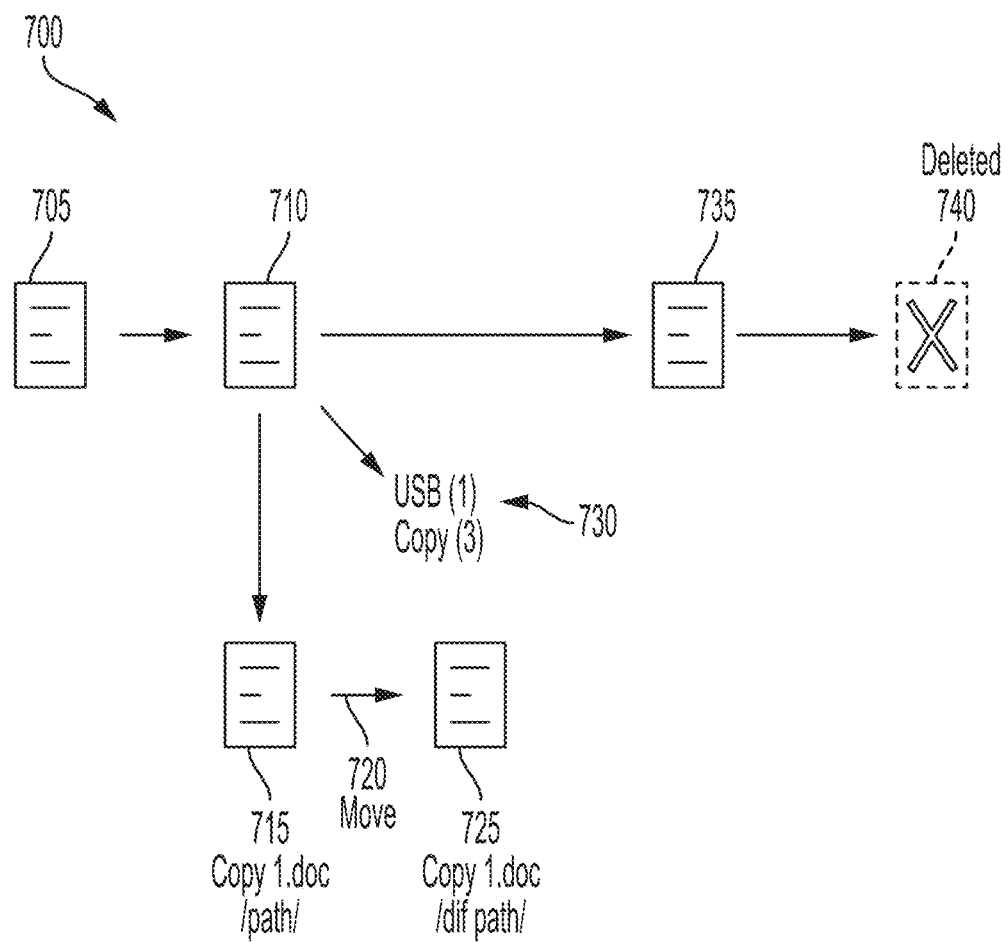
FIGS. 7A and 7B are block diagrams of examples of data trace graphs of a file on a computing device.

Referring now to FIG. 7A, depicted is an example of a data trace graph 700 of a file (e.g., the file instance 255) on a computing device (e.g., the first client 210A). The data trace graph 700 may be an example of the data trace graph 270, and may have been generated by the data tracing engine 205. The data trace graph 700 may be for a single file instance 255 as represented in the file icon 705, and may have multiple branches. The icon 710 may represent the file instance 255 after performance of an operation. In one branch, the icon 715 may indicate that the file instance 255 (e.g., named "Copy1.doc") is copied onto another location ("/path/"). The arrow 720 may indicate that a file move operation is performed onto the file instance 255. The icon 725 may indicate the new location ("/dif_path/"). One another branch, element 730 may indicate that the file instance 255 is copied onto a removable disk such as a USB. In another branch, the icon 735 may indicate that another operation is performed on the file instance 255, and the deletion icon 740 may indicate that a deletion operation was performed.

Figure 7B:
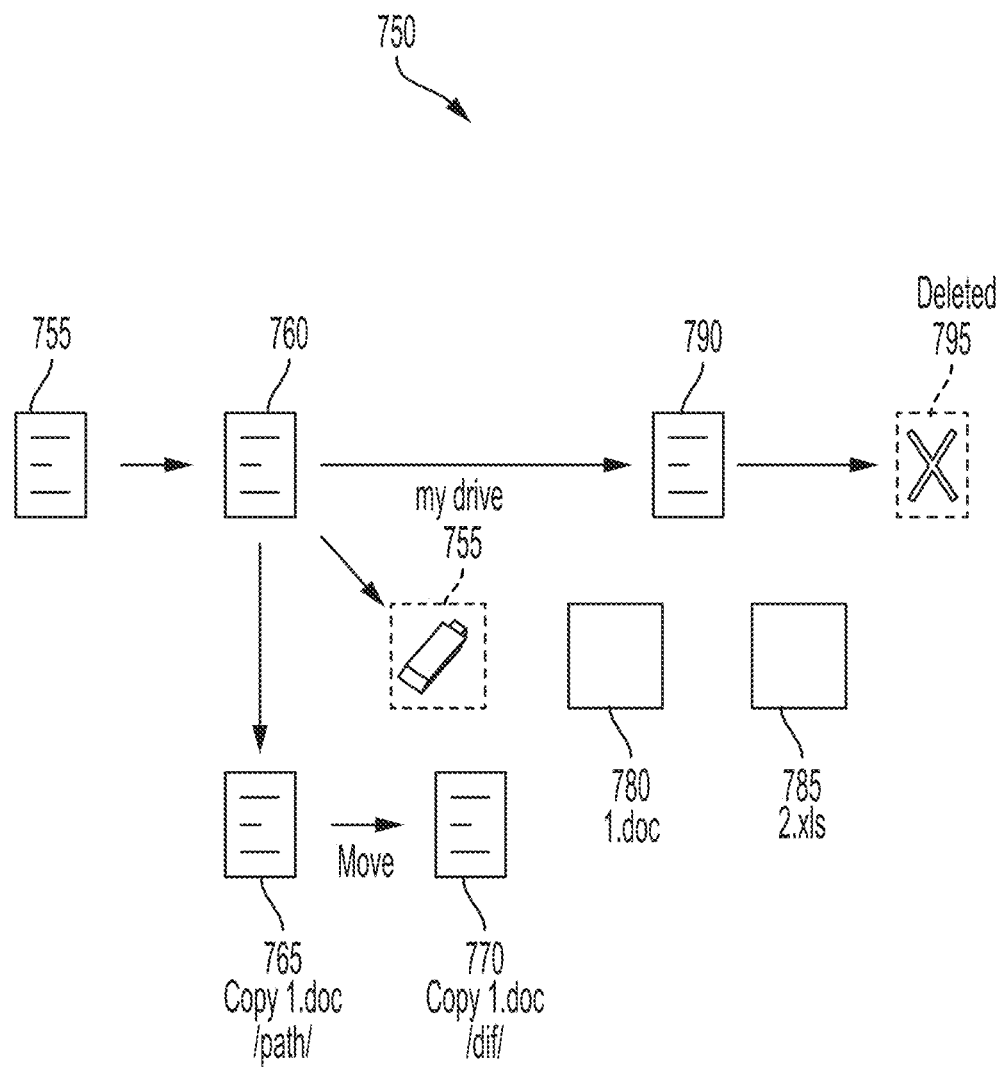

Referring now to FIG. 7B, depicted is an example of a data trace graph 750 of a file (e.g., the file instance 255) on a computing device (e.g., the first client 210A). The data trace graph 750 may be an example of the data trace graph 270, and may have been generated by the data tracing engine 205. The data trace graph 750 may be for a single file instance 255 as represented in the file icon 755, and may have multiple branches. The icon 760 may represent the file instance 255 after performance of an operation. In one branch, the icon 765 may indicate that the file instance 255 (e.g., named "Copy1.doc") is copied onto another location ("/path/"). The icon 770 may indicate the new location ("/dif_path/") subsequent to a file move operation. One another branch, element 755 may indicate that the file instance 255 is copied onto a removable disk such as a USB. The file icons 780 and 785 may indicate that at least two replications of the a portion of the contents in the file instance 255 are on the removable disk ("1.doc") and ("2.xls"). In another branch, the icon 790 may indicate that another operation is performed on the file instance 255 and the deletion icon 795 may indicate that a deletion operation was performed.

Figure 8A:
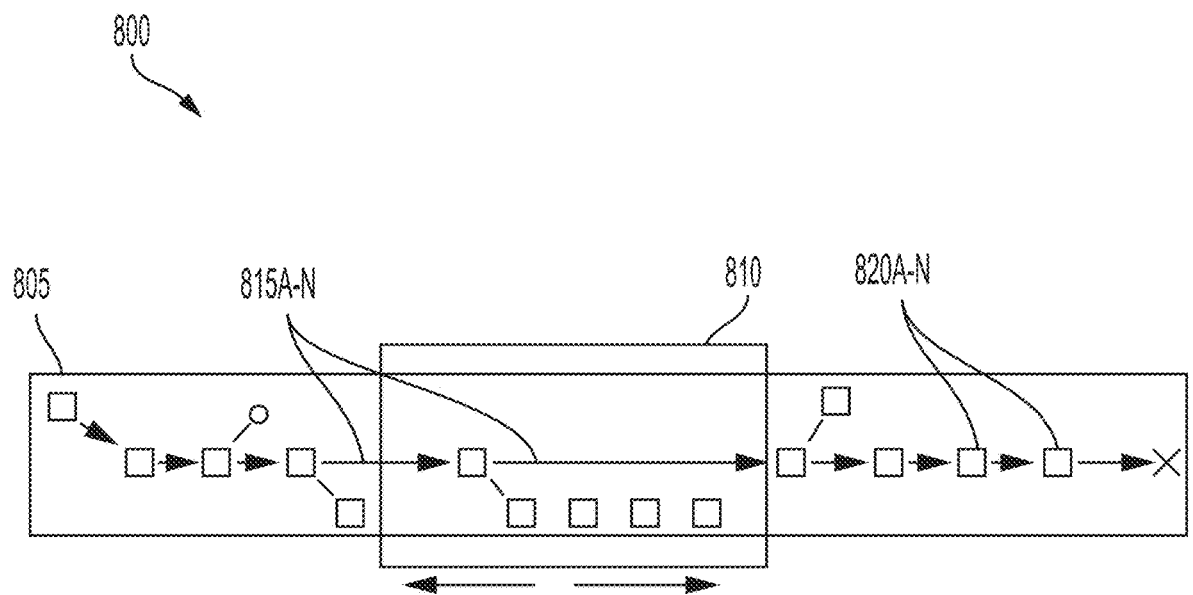
FIGS. 8A and 8B are block diagrams of example graphical user interfaces for navigating data trace graphs for files.

Referring now to FIG. 8A, depicted is an example graphical user interface 800 for navigating a data trace graph 805 for a file (e.g., the file instance 255). The data trace graph 805 of the graphical user interface 800 may be part of an example of the data trace graph 270, and may have been generated by the data tracing engine 205. The graphical user interface 800 may allow for horizontal scrolling through the data trace graph. The graphical user interface 800 may include a viewport 810 through which a portion of the data trace graph 805 is visible. The data trace graph 805 may include one or more arrows 815A-N representing operations 260 and one or more icons 820A-N representing file instances 255. By moving the viewport 810 horizontally, different subsets of the arrows 815A-N and icons 820A-N of the data trace graph 805 may be visible.

Figure 8B:
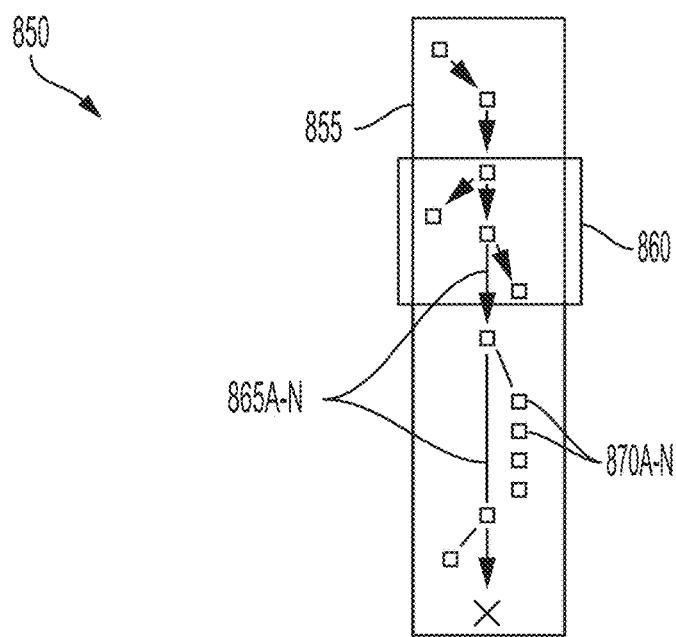

Referring now to FIG. 8B, depicted is an example graphical user interface 850 for navigating a data trace graph 855 for a file (e.g., the file instance 255). The data trace graph 855 of the graphical user interface 850 may be part of an example of the data trace graph 270, and may have been generated by the data tracing engine 205. The graphical user interface 850 may be similar to the graphical user interface 800, but with vertical scroll functionalities. The graphical user interface 850 may include a viewport 810 through which a portion of the data trace graph 855 is visible. The data trace graph 855 may include one or more arrows 865A-N representing operations 260 and one or more icons 870A-N representing file instances 255. By moving the viewport 860 vertically, differing subsets of the arrows 865A-N and icons 870A-N of the data trace graph 855 may be visible.

Figure 9:
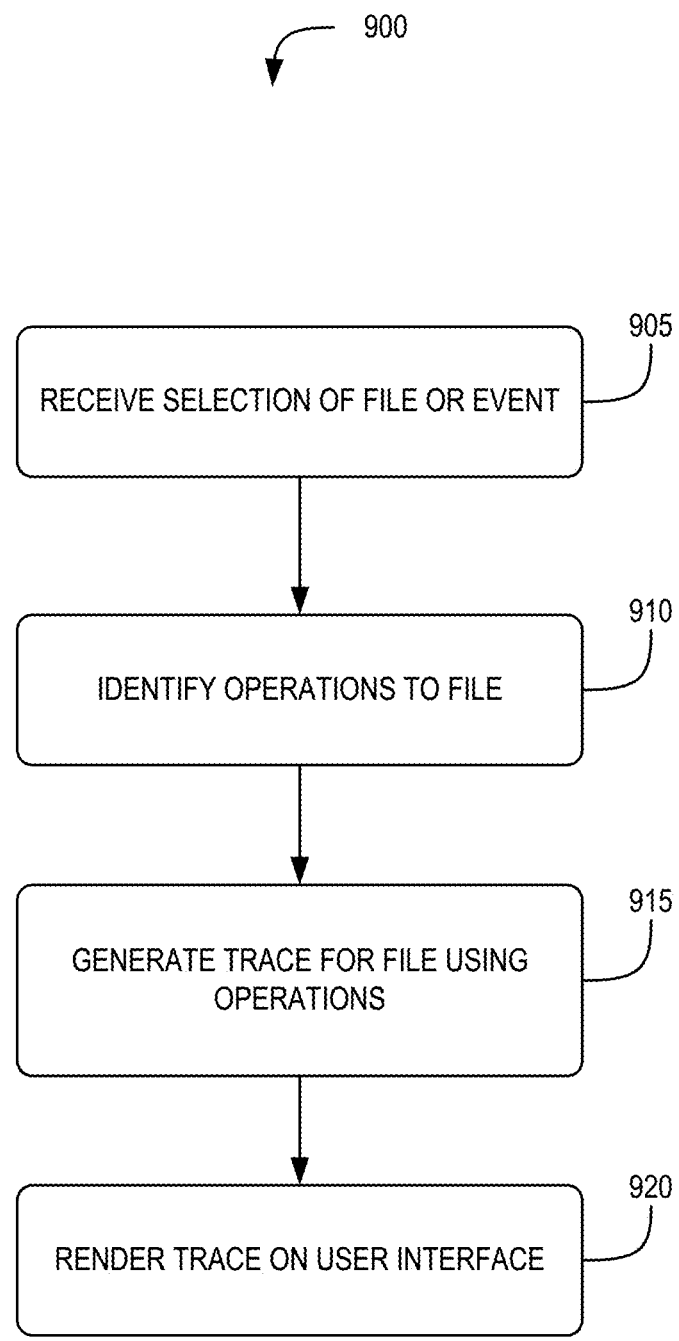
FIG. 9 is a flow diagram depicting an example embodiment of a method of tracing data across file-related operations.

Referring now to FIG. 9, depicted is a flow diagram of a method 900 of tracing data across file-related operations. The method 900 may be performed or be executed by any one or more components of the system 100 described above in conjunction with FIGS. 1A-1D or the system 200 described above in conjunction with FIG. 2. In brief overview, a tracing engine may receive a selection of a file or an event (905). The tracing engine may identify operations to the file (910). The tracing engine may generate a trace for the file using the operations (915). The tracing engine may render the trace on a user interface (920).

In further detail, a tracing engine (e.g., the data tracing engine 205) may receive a selection of a file (e.g., the file instance 255) or an event (e.g., the operations 260) (905). The following passages may describe tracing a file by way of illustration, although data can similarly or alternately be traced in the same or a similar fashion. The tracing engine may receive the selection via a user interface (e.g., from the listing 265 of the user interface 230). The tracing engine may also identify the files in a networked environment (e.g., the system 200) by accessing devices (e.g., clients 210 or data storage 215) connected to the environment. When the selection is of an event, the tracing engine may identify the file to which the operation is applied. The tracing engine may monitor for operations performed on the files in the networked environment.

The tracing engine may identify operations to the file (910). For the selected file, the tracing engine may identify the operations performed to the file. The operations may include, for example, data-related operations (e.g., a file open; a file write; a file content edit; copy and paste; and a print operation) or file-related operations (e.g., a file copy; a file rename; a file move; a network upload; email; a file permission update; and a copy to storage), among others. In addition, the tracing engine may locate instances of the same file or data across the networked environment based on the operations.

The tracing engine may generate a trace for the file using the operations (915). Using the identified files and operations, the tracing engine may generate the trace. The trace may associate or relate a set of instances of the same file with one another via the operations performed to one of the instances in the set. The trace may also represent a timeline series (e.g., sequence or order) of events corresponding to operations performed on various instances of the same file. The tracing engine may generate the trace for a particular portion of data in the file, such as contents corresponding to sensitive or classified information.

The tracing engine may render the trace (e.g., the data trace graph 270) on a user interface (920). The rendered trace may include or correspond to a graphical visualization of the trace. The graph may include a graphical visualization for each file and for each operation relating among the files. Along one of the portions, the graph may have graphical representations of the files. Between the graphical representations of a pair of files, the graph may include a graphical representation of the operation relating the pair. The graphical representation of the operation may include a directional arrow indicating a forward trace or a backward trace.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Non-limiting examples of various embodiments are disclosed herein. Features from one embodiments disclosed herein may be combined with features of another embodiment disclosed herein as someone of ordinary skill in the art would understand.

As utilized herein, the terms "approximately," "about," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described and are considered to be within the scope of the disclosure.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

What is claimed is:

1. A system for tracing data, the system comprising:
a user interface; and
a tracing engine executable on at least one processor, the tracing engine configured to:
receive, via the user interface, a selection of a target file or an event involving the target file, wherein the target file is of a particular file format which an application running on the system may access contents of the target file;
generate, responsive to receiving the selection, a trace of first data in the target file to a plurality of file instances in a network each having at least one version of the first data, each of the plurality of file instances related to at least the target file or another of the plurality of file instances via at least one file operation or data operation performed on the target file or the another of the plurality of file instances, the trace having a plurality of branches each corresponding to a generation of a new file instance of the target file resulting from a file operation or data operation performed on one or more of the target file or the another of the plurality of file instances; and
render, via the user interface, the generated trace having the plurality of branches.

2. The system of claim 1, wherein the at least one file operation or data operation performed on the target file or the another of the plurality of file instances comprises at least one of: a file open, file write, file move, file copy, network upload, file rename, file content edit, file permission update, copy and paste, email, copy to storage, or print operation.

3. The system of claim 1, wherein the trace comprises a backward trace of the first data to a source of the first data in the network.

4. The system of claim 1, wherein the trace comprises a forward trace of the first data to at least one destination file instance.

5. The system of claim 1, wherein the first data comprises classified or sensitive data.

6. The system of claim 1, wherein the tracing engine is further configured to provide, for two adjacent file instances of the plurality of file instances along a portion of the trace, a corresponding file operation or data operation relating the two adjacent file instances.

7. The system of claim 1, wherein the tracing engine is further configured to render the generated trace by displaying a graph of the generated trace.

8. The system of claim 1, wherein the tracing engine is further configured to render a first portion of the trace linking two adjacent file instances of the plurality of file instances, by a directional arrow corresponding to a type of file operation or data operation relating the two adjacent file instances.

9. The system of claim 1, wherein the generated trace represents a timeline of events corresponding to the at least one file operation or data operation.

10. The system of claim 1, wherein the tracing engine is further configured to generate statistics of types of file operations or data operations associated with the generated trace.

11. A method of tracing data, the method comprising:
receiving, by a tracing engine via a user interface, a selection of a target file or an event involving the target file, wherein the target file is of a particular file format which an application running on the system may access contents of the target file;
generating, by the tracing engine responsive to receiving the selection, a trace of first data in the target file to a plurality of file instances in a network each having at least one version of the first data, each of the plurality of file instances related to at least the target file or another of the plurality of file instances via at least one file operation or data operation performed on the target file or the another of the plurality of file instances, the trace having a plurality of branches each corresponding to a generation of a new file instance of the target file resulting from a file operation or data operation performed on one or more of the target file or the another of the plurality of file instances; and
rendering, by the tracing engine in the user interface, the generated trace having the plurality of branches.

12. The method of claim 11, wherein the at least one file operation or data operation performed on the target file or the another of the plurality of file instances comprises at least one of: a file open, file write, file move, file copy, network upload, file rename, file content edit, file permission update, copy and paste, email, copy to storage, or print operation.

13. The method of claim 11, wherein the trace comprises a backward trace of the first data to a source of the first data in the network.

14. The method of claim 11, wherein the trace comprises a forward trace of the first data to at least one destination file instance.

15. The method of claim 11, wherein the first data comprises classified or sensitive data.

16. The method of claim 11, further comprising providing, by the tracing engine, for two adjacent file instances of the plurality of file instances along a portion of the trace, a corresponding file operation or data operation relating the two adjacent file instances.

17. The method of claim 11, comprising rendering the generated trace by displaying a graph of the generated trace.

18. The method of claim 11, further comprising rendering, by the tracing engine, a first portion of the trace linking two adjacent file instances of the plurality of file instances, by a directional arrow corresponding to a type of file operation or data operation relating the two adjacent file instances.

19. The method of claim 11, wherein the generated trace represents a timeline of events corresponding to the at least one file operation or data operation.

20. A non-transitory computer readable medium storing program instructions for causing one or more processors to:
receive, via a user interface, a selection of a target file or an event involving the target file, wherein the target file is of a particular file format which an application running on the system may access contents of the target file;
generate, responsive to receiving the selection, a trace of first data in the target file to a plurality of file instances in a network each having at least one version of the first data, each of the plurality of file instances related to at least the target file or another of the plurality of file instances via at least one file operation or data operation performed on the target file or the another of the plurality of file instances, the trace having a plurality of branches each corresponding to a generation of a new file instance of the target file resulting from a file operation or data operation performed on one or more of the target file or the another of the plurality of file instances; and render, via the user interface, the generated trace having the plurality of branches.

* * * * *